United States Patent [19]

Deremo et al.

[11] 4,123,188
[45] Oct. 31, 1978

[54] CONTROL SYSTEM FOR PECK DRILLING TOOL

[75] Inventors: Edwin J. Deremo; Hans P. Olving, both of Spring Lake, Mich.

[73] Assignee: Gardner-Denver Company, Dallas, Tex.

[21] Appl. No.: 784,348

[22] Filed: Apr. 4, 1977

[51] Int. Cl.² ............................................. B23B 47/34
[52] U.S. Cl. ..................................................... 408/17
[58] Field of Search .................................. 408/17, 130

[56] References Cited

U.S. PATENT DOCUMENTS

| | | | |
|---|---|---|---|
| 2,631,480 | 3/1953 | Romine et al. | 408/130 X |
| 3,273,425 | 9/1966 | Hodgson | 408/17 |
| 3,286,555 | 11/1966 | Klancnik | 408/17 X |

*Primary Examiner*—Gil Weidenfeld

*Attorney, Agent, or Firm*—Richards, Harris & Medlock

[57] ABSTRACT

An automated and adjustable control system for conducting peck drilling operations wherein a drill bit is advanced stepwise in successively increasing penetrations, rapidly retracted after each penetration to remove cuttings, thereafter rapidly advanced toward a work face and then slowed to a drilling advanced rate beginning with the bit a predetermined distance from the work face. Preferably, a pneumatic means rapidly retracts the drill upon completion of each penetration step. A feed rate control unit is partially retracted but limited to a distance less than retraction of the drill. When the drill is rapidly advanced by pneumatic means during each penetration step, the feed rate is decreased by the feed rate control unit to a uniform drilling rate prior to engaging the work face in the work piece.

10 Claims, 4 Drawing Figures

CONTROL SYSTEM FOR PECK DRILLING TOOL

FIELD OF THE INVENTION

The invention relates to pneumatic drill tool systems which cyclically retract and advance a drill bit in successively increasing penetration steps and more particularly to arresting rapid advance of the tool a predetermined distance from the work face.

PRIOR ART

In the drilling of deep holes in a work piece, it is desirable that the drill bit be periodically retracted and advanced automatically in a so-called pecking cycle to accommodate the removal of drill cuttings. If the drill cuttings are not removed, the flutes of the drill bit may be clogged and the bit itself damaged.

Peck drilling tools heretofore used have not arrested the rapid advance portion of the pecking cycle at a predetermined distance from the work face. As a result, the drill bit is advancing faster than the desired drilling feed rate when the bit engages the work face causing drill bit breakage, work piece destruction and excessive down time.

SUMMARY OF THE INVENTION

A peck drilling tool is provided which includes an automated and adjustable control system for rapid cyclical retraction and advance of a drill bit at controlled rates during successively increasing penetration steps and for arresting the rapid advance a predetermined distance from the work face. In one embodiment the control system comprises a hydraulic feed rate control unit which modifies operation of a pneumatic control unit which controls the advance of the drill bit.

DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

DESCRIPTION OF PREFERRED EMBODIMENTS

Figure 1:
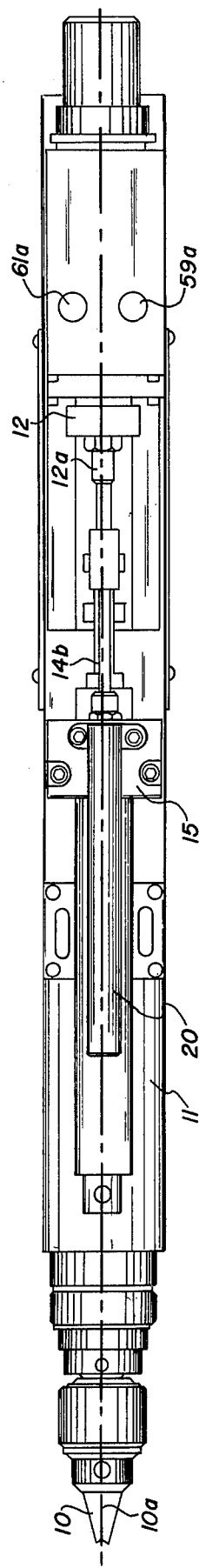
FIG. 1 is a top view of a drill system embodying the present invention.
Figure 2:
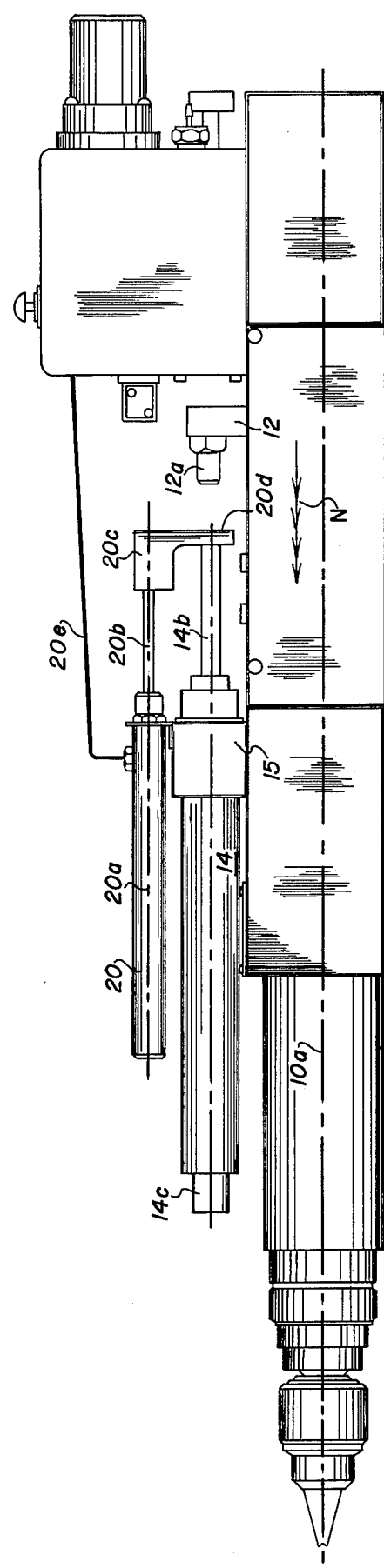
FIG. 2 is a side view of the drill system of FIG. 1.

FIGS. 1 and 2 illustrate a fluid operated drill which is basically of the type manufactured and sold by Gardner-Denver Company, Pneutronics Division, Grand Haven, Mich., and identified as the MM series Air Feed Drill.

A chuck 10 for gripping a drill bit extends from a housing 11 wherein it is driven by means well known in the pneumatic drill system art. Further, the means within housing 11 for applying retraction and advance forces from a main piston for feeding the chuck 10 are well known and a part of the prior art.

In accordance with a preferred embodiment of the invention, a follower 12 is mounted to move with the main feed piston and thus with the chuck 10. More particularly, follower 12 is advanced and retracted between the rest position illustrated in FIGS. 1 and 2, and forward positions as generally indicated by arrows N. Successively deeper penetration cycles are represented by the plural arrowheads associated with arrow N, FIG. 2.

A hydraulic feed rate control unit 14 is mounted in a bracket 15 on housing 11 with the axis 14a of the unit parallel to the axis 10a of the chuck 10. A piston rod 14b extends rearward from unit 14 and has a longitudinal axis aligned with a boss 12a extending forward from the follower 12. The control unit includes an adjustment means such as knob 14c for controlling the magnitude of a force opposing movement of the chuck 10 into the work piece. Such a force may be of the order of 5 pounds to several hundred pounds, the magnitude of the force being selected depending upon the rate at which it is desired to feed the drill into the work piece. The feed rate control unit 14 includes a return spring therein which causes the rod 14b to follow boss 12a during retraction.

In accordance with this embodiment, a pneumatic return unit 20 is provided to operate in conjunction with control unit 14 to permit rod 14b to follow boss 12a only a relatively small predetermined distance. Return control unit 20 is comprised of a piston having a piston rod 20b extending rearward with longitudinal axis 20a parallel to the axis 14a. A foot 20c is rigidly mounted on rod 20b, and has a toe portion 20d that extends over the end of rod 14b. Air is metered to control unit 20 by way of a line 20e upon initiation of each return cycle of the chuck 10.

In operation during each rapid advance of chuck 10, the follower 12 moves with the chuck 10. When boss 12a contacts toe 20d in any given cycle, the rapid rate at which the drill and chuck 10 penetrate the work piece is decreased to a low drilling rate as determined by the characteristics of the unit 14. Upon initiation of each return cycle, air is metered into control unit 20 by way of line 20e. A resulting force at toe 20d thereby is built up over a short period of time to oppose the retraction force applied by the spring in unit 14. The rate of buildup is such that the spring force is neutralized by the time piston rod 14b has moved a predetermined distance. In the preferred embodiment disclosed herein, such distance is normally of the order of 0.02 inch. Upon the next advance cycle, boss 12a moves rapidly to contact toe 20d. This drives rod 14b into unit 14 under the control of the hydraulic characteristics of the control unit. The forward velocity of chuck 10 is abruptly reduced to the desired drilling speed and follower 12 thereafter moves forward under the control of unit 14.

Figure 3:
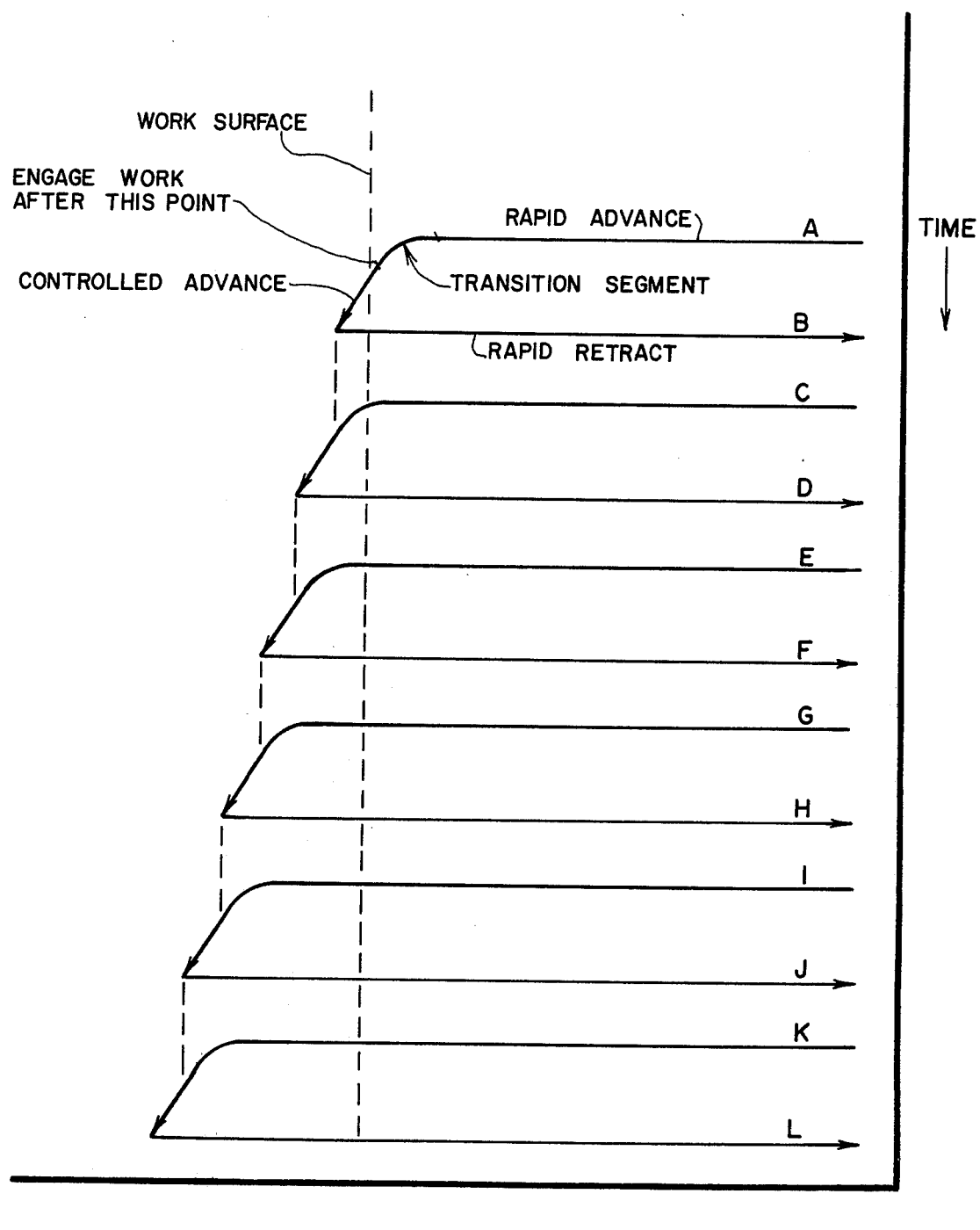
FIG. 3 is a time-displacement graph of the operation of the drill system of FIG. 1.

Movements of the chuck 10 during drilling operations may be more clearly understood by referring to the time-displacement graph of FIG. 3. As before described, the chuck is rapidly retracted periodically to clean cuttings from the bit and thereby avoid damage to both the bit and the work piece. During the first peck cycle, the chuck 10 is advanced in accordance with arrow A, and then retracted in accordance with arrow B. The chuck is further advanced as indicated by arrow C in a second peck cycle and again retracted as indicated by arrow D. Subsequent advances E, G, I and K are followed by retractions F, H, J and L, respectively. Each successive penetration is greater than the previous one as indicated by the successively increasing lengths of arrows A, C, E, G, I and K.

It is to be understood that while the drill is actually engaged with the work piece and drilling, the penetration rate will be at a slow controlled rate. For efficient operation, however, the retraction cycles are at high speed. Further, the advance rate after retraction toward the work face should be at high speed. The present invention permits a full high speed retraction followed by high speed advance to a point at which the bit is short of the work face in the work piece.

With the foregoing understanding of the objectives of the invention, structure to be used in connection with the preferred embodiment is now described with reference to FIG. 4.

Figure 4:
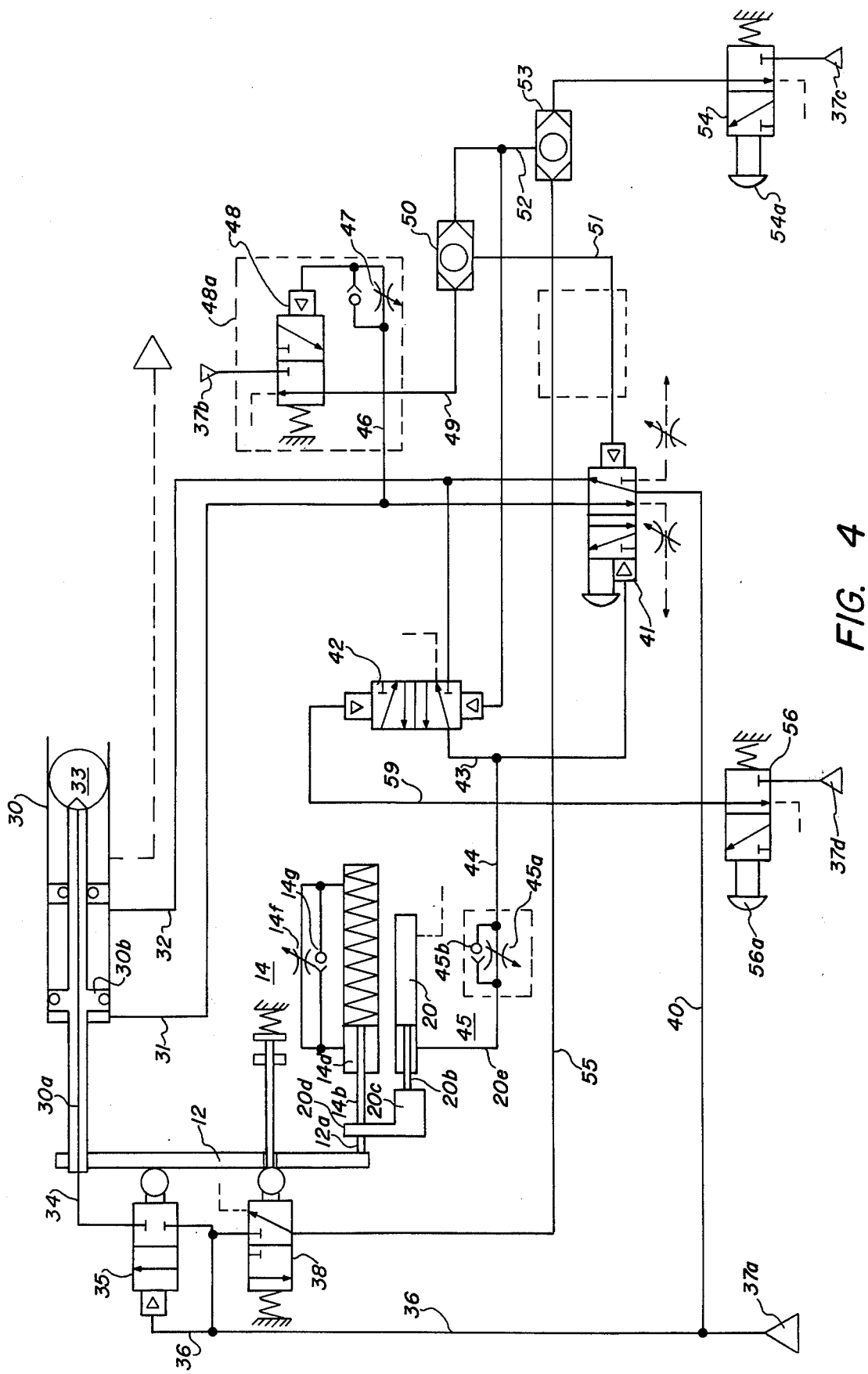
FIG. 4 is a detailed schematic diagram of a control system employed in the drill system of FIG. 1.

FIG. 4 illustrates a control system embodying the present invention. The follower 12 is mounted on an advance piston rod 30a of a main feed piston 30b. Piston 30b operates within a cylinder 30 to move rod 30a. The piston 30b is caused to feed the drill by application of air supplied by way of an air feed line 31, and to retract the drill by application of air through a line 32. A motor 33 is pneumatically driven by air applied by way of a passage which extends the length of piston rod 30a from an air line 34. Line 34 leads from an outlet of a two-way, pilot activated mechanical return motor valve 35.

Operating air is supplied to valve 35 by way of an air line 36 leading from an inlet 37a. Line 36 also is coupled to inlets on valve 35 and on a depth valve 38 by way of an air line 39. Inlet 37a further is connected by way of an air line 40 to the supply port of a double pilot activated, four-way feed and return valve 41.

With valve 41 in the illustrated position, line 40 is connected through valve 41 to both the return line 32, and to the supply port of a double pilot activated, four-way return control valve 42. The output port on valve 42 is connected by way of an air line 43 to the pilot feed port of valve 41, and by way of lines 43 and an air line 44 through a flow control unit 45 to control unit 20.

The feed line 31 is connected by way of an air line 46 through a flow control unit 47 to the pilot feet port of a normally closed three-way valve 48. The flow control unit 47 and the normally closed three-way valve 48 comprise an adjustable timer valve 48a. An input port to valve 48 is in fluid communication with an air supply inlet 37b. The output port of valve 48 is connected by way of an air line 49, a shuttle valve 50 and an air line 51 to the pilot return port of valve 41.

A second input to shuttle valve 50 is supplied by way of an air line 52 leading from a second shuttle valve 53. Line 52 also leads to a pilot port of valve 42. One input of valve 53 is supplied by an emergency return valve 54, which has an input connected to an air supply inlet 37c. The second input to valve 53 is supplied by an air line 55 leading from the output port of depth valve 38.

A remote start valve 56 has an input port connected to an air supply inlet 37d and an output port connected by way of an air line 59 to a second pilot port of control valve 42. In the preferred embodiment described herein, valve 56 is a mechanically activated and normally closed three-way valve with spring return.

Control unit 14 is comprised of a piston 14d and an internal spring 14e which normally urges the piston to the left. The piston is bypassed by an adjustable flow restriction 14f operating in parallel with a check valve 14g. Travel of the piston in the feed direction thus requires fluid to pass through the restriction 14f, thereby controlling the rate at which piston 30b can drive the motor 33 to urge the chuck 10 into a work piece. It should be noted that the orifice of restriction 14f is adjustable by means of the knob 14c of FIG. 2. Further, the flow control unit 45 has an adjustable orifice 45a that is bypassed by a check valve 45b.

In operation, the orifice 45a is adjusted such that when an air signal is received in line 44 and sent through the flow control unit 45 to control unit 20, the force developed in unit 20 will rise at a rate to overcome the return force of the spring 14e after the piston has moved a predetermined distance. This distance is selected to assure that when the drill is next advanced, and threaded member 12a engages toe 20d at high speed, further advance is under the control of unit 14. Unit 14 thereafter reduces the feed rate to a controlled level before the point of the bit reaches the face of the work piece.

When the remote start valve 56 is activated to shift the position of the spool in control valve 42, air from the outlet 43 is supplied to the pilot feed port of the valve 41. The output of the valve 41 thereupon is diverted from both the return side of the piston 30b and the supply port of the control valve 42. More particularly air flows from the valve 41 to the advance side of the piston 30b through line 31 and to the input port 46 of the adjustable timer valve 48a.

As the drill feeds forward, the motor valve 35 opens and the motor 33 is activated. The control unit 14 is adjusted to control the feed rate of piston 30b while drilling, and the piston continues to advance until the timer valve 48a generates an output signal. It is to be understood that the timer valve may be adjusted to vary the peck cycle, thereby accommodating the particular drilling environment encountered.

The output of the timer valve 48a is applied to the pilot return port of the valve 41. As the spool of valve 41 is shifted, its output is switched to the return side of the piston 30b and to the supply port of the valve 42. The output of the valve 42 in turn is applied to the pilot feet port of valve 41, and through the flow control unit 45 to the control unit 20. Air is metered through valve 45 to the control unit 20 to increase the air pressure to a point where the spring return of the control unit 14 is equalized to arrest the extension of rod 14b. The chuck 10 and follower 12, however, continue to retract in response to feed piston 30b. The exhaust pressure on the advance side of the piston 30b is sufficient to hold the timer valve 48a in the open position, and thereby maintain air pressure through lines 49 and 51 to the pilot return port of the valve 41. The valve 41 thus is prevented from shifting until the feed piston has been fully retracted.

When the piston 30b is in the fully retracted position, the exhaust pressure on the advance side of the feed piston bleeds down to allow the timer valve 48a to close. The pilot return port of the valve 41 then may exhaust through the timer valve 48a. The air pressure at the pilot feed port of valve 41 thereupon shifts the valve output to lines 31 and 46, thereby advancing piston 30b.

The chuck 10 and follower 12 are rapidly advanced forward until the threaded member 12a engages toe 20d. The feed rate thereafter is decreased by the hydraulic feed rate control unit 14 to a controlled level before the drill bit engages the work piece. The piston 30b continues to advance until the timer valve 48a generates an output signal to again retract the piston 30b.

The pecking cycles are continued until a desired depth is reached. In that event, the depth valve 38 closes to apply an air signal through valve 53 to a pilot port of valve 42, and also through valves 53 and 50 to the pilot return port of valve 41. The valve 41 thereby is shifted to retract the chuck 10 and follower 12 to the initial start position. Further, the control valve 42 is shifted to the open position to prevent air from passing to the pilot feed port of valve 41 and to the control unit 20. The drill thus is returned, shut off, and the feed control unit 14 is spring returned to the initial starting position.

The drill system also may be shut off and placed in a start position by manually depressing the actuator button 54a of the emergency return valve 54. The drill system responds in a manner analogous to that described for depth value 38 to interrupt the automatic pecking cycle at any time during a drilling operation. After a shutdown, the drilling tool again may be activated by depressing the start button 56a of valve 56.

Having described the invention in connection with certain specific embodiments thereof, it is to be understood that further modifications may now suggest themselves to those skilled in the art, and it is intended to cover such modifications as fall within the scope of the appended claims.

What is claimed is:

1. In a control system for a drill wherein a drill bit mounted on a feed mechanism is advanced at an advance travel rate in successively increasing steps to machine successive work faces in a work piece, and retracted between each step to remove cuttings, the combination which comprises:
   (a) feed rate control means for engaging the feed mechanism when said drill bit is a predetermined distance from each successive work face to decrease the advance travel rate before said bit contacts the work piece, said feed rate control means being mechanically biased away from the work piece and being operable to retract to follow the retractive travel of the drill bit for a predetermined travel, and
   (b) means operable in response to initiation of each drill bit retraction for generating a force increasing with time to arrest the retraction of said control means before said drill bit is fully retracted to limit the retraction of said control means to the predetermined travel.

2. In a drill system where a drill bit mounted on a main feed piston is advanced for stepwise penetration into a work piece under the control of a feed rate control unit, and retracted between each penetration step for removal of cuttings, the combination which comprises:
   (a) spring means for applying a retraction force to said control unit upon the completion of each said penetration,
   (b) means responsive to initiation of each drill bit retraction for applying an arresting force to said control unit in opposition to said retraction force before the drill bit is fully retracted, the retraction force and arresting force being operable to dispose said control unit in a retracted position.

3. In a peck drilling tool where a drill bit is advanced stepwise with successively increasing penetrations into a work piece, then rapidly retracted between penetrations for removal of cuttings and thereafter rapidly advanced towards each of the successively machined work faces in the work piece, the combination which comprises:
   (a) feed rate control means for controlling the rate of advance of said drill bit,
   (b) follower means for advancing and retracting in unison with said drill bit and for periodically engaging said control means, and
   (c) force generating means for selectively maintaining said rate control means in contact with said follower means during drill bit retraction and for limiting each retraction travel of said control means, said rate control means being operable to arrest each rapid advance of said drill bit beginning when said drill bit is within a predetermined distance from each successive work face.

4. In a drill system including a drill bit and a feed mechanism for stepwise advancing the drill bit for successively increasing penetrations into a work piece to machine successive work faces therein and for rapidly retracting the drill bit between penetrations for cuttings removal and thereafter rapidly advancing the drill bit towards the work face, the improvement comprising:
   (a) an advance feed rate control mechanism adapted to be added to the drill system and including first means for mechanically engaging the feed mechanism to control the advance rate of the drill bit when the drill bit is within a predetermined distance of each successive work face, said first means being mechanically biased to retract away from the work piece upon the retraction of the drill bit, and
   (b) modifying means for limiting each retraction of said first means to a predetermined travel to dispose said first means in position for engaging the feed mechanism when the drill bit is advanced to within the predetermined distance from each successive work face machined in the work piece.

5. The system as set forth in claim 4 further comprising adjustment means for selectively controlling the length of the predetermined travel of said first means.

6. The system as set forth in claim 4 wherein said advance feed rate control mechanism comprises a first hydraulic cylinder, a first piston, and a spring disposed within said cylinder to mechanically bias said first piston away from the work piece to retract said first piston upon the retraction of the drill bit.

7. The system as set forth in claim 6 wherein said first means comprises a follower attached to the feed mechanism and a foot member attached to said first piston, said foot member including a toe portion for periodically engaging said follower.

8. The system as set forth in claim 4 wherein said modifying means comprises a second hydraulic cylinder and piston assembly attached to said advance feed rate control mechanism to limit the retraction thereof.

9. In a drill where a tool is advanced and retracted under control of a hydraulically actuated main piston, an add on control unit for use in peck drilling operations which comprises:
   (a) a follower coupled to said piston for advancing and retracting in unison with said tool,
   (b) a hydraulic regulator mounted in the path of said follower for controlling the advance of said tool and including a spring mounted therein to oppose advance movements of said follower, said hydraulic regulator being spring biased to follow the retractive motion of said main piston and said follower,
   (c) a hydraulically actuated control piston having a toe member in said path between said follower and said regulator, and (d) means operable upon each retraction of said main piston to cause said control piston to limit the spring actuated retractive motion of said regulator to a predetermined traverse whereby following each retraction of said tool, said main piston rapidly may advance said tool to the point that said follower engages said toe and thereafter advance said predetermined traverse at a rate controlled by said regulator.

10. The add on control unit as set forth in claim 9 wherein the hydraulic regulator comprises a regulator hydraulic cylinder having a regulator piston and spring mounted therein, said regulator piston being spring biased in the retractive direction of the tool and being disposed in the path of said follower to control the advance of said tool, said hydraulic cylinder including a valve means for controlling the advance rate of said regulator piston.

* * * * *